United States Patent
Felse et al.

(10) Patent No.: US 10,062,060 B2
(45) Date of Patent: Aug. 28, 2018

(54) OPTICAL CHARACTER RECOGNITION PRE-VERIFICATION SYSTEM

(71) Applicant: Bank of America Corporation, Charlotte, NC (US)

(72) Inventors: Mark D. Felse, Indian Land, SC (US); Richard A. Banks, Jr., Newark, DE (US); James Benton, Matthews, NC (US); Theresa Brennan, Garnet Valley, PA (US); Sarah Christine, Smyrna, DE (US); Dewayne A. Furr, Burleson, TX (US); Melody Gentile, Newark, DE (US); Michele N. Hanshew, Smyrna, DE (US); Kerry Kurt Simpkins, Fort Mill, SC (US); John Barrett Hall, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 402 days.

(21) Appl. No.: 14/834,591

(22) Filed: Aug. 25, 2015

(65) Prior Publication Data
US 2017/0061399 A1    Mar. 2, 2017

(51) Int. Cl.
*G06Q 20/10* (2012.01)
*G06Q 20/04* (2012.01)
(Continued)

(52) U.S. Cl.
CPC .......... *G06Q 20/10* (2013.01); *G06Q 20/042* (2013.01); *G06Q 20/102* (2013.01);
(Continued)

(58) Field of Classification Search
CPC ..... G06Q 20/10; G06Q 20/204; G06Q 40/025
(Continued)

(56) References Cited

U.S. PATENT DOCUMENTS 5,815,592 A * 9/1998 Mennie ................. B65H 3/063
209/534
7,165,723 B2 1/2007 McGlamery et al.
(Continued)

OTHER PUBLICATIONS

Bicknell et al., "Forged and Counterfeit Documents", Sep. 15, 2009, (Year: 2009).*
(Continued)

*Primary Examiner* — Eric T Wong
*Assistant Examiner* — Kevin T Poe
(74) *Attorney, Agent, or Firm* — Weiss & Arons LLP; Michael A. Springs, Esq.

(57) ABSTRACT

A system for optical character recognition pre-verification is provided. The system may review payment documents. The payment documents may include remit stubs and paper checks. The system, utilizing optical character recognition software, may determine dollar amounts on the remit stubs and the paper checks. The optical character recognition software may determine a confidence level of whether the determined amount is the same amount that the writer of the check. If the confidence level is above first predetermined threshold level of confidence and below a second predetermined threshold level of confidence, the system may present an operator with a pre-verification GUI. The pre-verification GUI may include a view of the remit stub, a view of the check, the dollar amount due, a match button and a do not match button. Upon selection of either the match or do not match button, the payment may be processed in another check-processing system.

18 Claims, 5 Drawing Sheets

(51) Int. Cl.
    *G06Q 20/42*     (2012.01)
    *G06Q 40/02*     (2012.01)
    *G06Q 20/20*     (2012.01)

(52) U.S. Cl.
    CPC .......... *G06Q 20/204* (2013.01); *G06Q 20/42* (2013.01); *G06Q 40/025* (2013.01)

(58) Field of Classification Search
    USPC .......................................................... 705/39
    See application file for complete search history.

(56) References Cited

U.S. PATENT DOCUMENTS

| | | | |
|---|---|---|---|
| 7,187,795 B2 * | 3/2007 | Jones | G06Q 20/042 |
| | | | 209/534 |
| 7,653,600 B2 * | 1/2010 | Gustin | G06Q 20/10 |
| | | | 705/39 |
| 8,165,933 B2 | 4/2012 | Dryer et al. | |
| 8,428,332 B1 * | 4/2013 | Csulits | G07F 19/20 |
| | | | 235/379 |
| 8,606,705 B2 | 12/2013 | Zanzot et al. | |
| 8,606,706 B2 | 12/2013 | Zanzot et al. | |
| 2005/0108168 A1 * | 5/2005 | Halpin | G06Q 20/042 |
| | | | 705/45 |
| 2006/0219773 A1 | 10/2006 | Richardson | |
| 2011/0125639 A1 * | 5/2011 | Abed | G06Q 20/042 |
| | | | 705/42 |
| 2012/0023017 A1 * | 1/2012 | Votaw | G06Q 20/1085 |
| | | | 705/43 |

OTHER PUBLICATIONS

Li et al., "Signature Security System for E-Commerce", Biometric Solutions for authentication in an e-world, chapter 8 (Year: 2002).*
Gunaratna et al., "ANN Based Currency Recognition System using Compressed Gray Scale and Application for Sri Lankan Currency Notes", 2008, World Academy of Science, Engineering and Technology International Journal of Computer, Electrical, Automation, Control and Information Engineering, vol. 2 No. 9 (Year: 2008).*

* cited by examiner

John Smith
123 Main Street
Anytown, NY 00000

| Equity Number: | 0000 0000 000000 |
| Current Payment Due: | $3,000,000 |
| Past Due Amount: | $0.00 |
| Total Minimum Payment Due: | $960.00 |
| Payment Due Date: | 11/16/2015 |

If payment is received after 11/16/2015 please pay $3,035.00 which includes a $35.00 late fee.
• In order to receive your payment by the due date we suggest mailing at least five (5) days prior to that date
• Please refer to important disclosures, account and payment information found elsewhere in this statement Minimum Payment Due:     $960.00

Payment Enclosed     $3,000
Make Check Payable to:

Bank
P.O. Box 000000
Anytown, NY 00000

263079276 : 1234567890: 0101
: 263079276 1234567890

---

John Smith
123 Main Street
Anytown, NY 00000

BANK ABC
ANYTOWN, NY  00000     0001

Date  3/13/2015

Pay to the Order of  BANK

Three Thousand and 00/100 ***************************************************Dollars BANK
P.O. Box 000000
ANYTOWN, NY 00000

MEMO  LOAN

263079276 : 1234567890: 0101

---

DOLLAR AMOUNT: $2,000.00

| MATCH | DOES NOT MATCH |

| John Smith<br>123 Main Street<br>Anytown, NY 00000 | Minimum Payment Due: $960.00 |

John Smith
123 Main Street
Anytown, NY 00000

Equity Number: 0000 0000 000000
Current Payment Due: $3,000,000
Past Due Amount: $0.00
Total Minimum Payment Due: $960.00
Payment Due Date: 11/16/2015

If payment is received after 11/16/2015 please pay $3,035.00 which includes a $35.00 late fee.
• In order to receive your payment by the due date we suggest mailing at least five (5) days prior to that date
• Please refer to important disclosures, account and payment information found elsewhere in this statement Minimum Payment Due: $960.00

Payment Enclosed $3,000

Make Check Payable to:

Bank
P.O. Box 000000
Anytown, NY 00000

263079276 : 1234567890: 0101
: 263079276 1234567890

504

John Smith
123 Main Street
Anytown, NY 00000

BANK ABC
ANYTOWN, NY 00000        0001

Date 3/13/2015

Pay to the
Order of  BANK

Three Thousand and 00/100 ************************************************Dollars BANK
P.O. Box 000000
ANYTOWN, NY 00000

MEMO  LOAN

John Smith

263079276 : 1234567890: 0101

506

DOLLAR AMOUNT: $2,000.00

| MATCH | DOES NOT MATCH | DO NOT KNOW |
| 508 | 510 | 512 |

FIG. 5

OPTICAL CHARACTER RECOGNITION PRE-VERIFICATION SYSTEM

FIELD OF TECHNOLOGY

This invention relates to optical character recognition. Specifically, this invention relates to optical character recognition software as used in pre-verification systems.

BACKGROUND OF THE DISCLOSURE

Optical character recognition software is used in various disciplines for identifying characters on documents. Many entities receive thousands of payment documents daily. These payments may be mailed by the entities' customers. Most payments may include a check and a remit stub. The remit stub may include identifying customer information.

Some of the received payments may include neatly written checks and properly completed remit stubs. Other received payments may include illegible checks and blank remit stubs. Yet other received payments may include barely legible checks and partially completed remit stubs.

Properly completed checks and remit stubs may require relatively less human intervention to review and process than the incorrect or illegible payments. In fact, the proper payments may, in certain circumstances, not require human intervention at all. The mediocre payments may require more review time than the optimum payments, though less review time than the illegible payments. The mediocre payments may require minimal human intervention while illegible payments may require more significant human analysis.

Conventionally, payments were processed either in a straight through processing ("STP") system that did not utilize human intervention, or in a verification processing system that utilized two operators functioning with two distinct computers. Many payments did not qualify for STP processing and therefore were being processed in the verification system. Although these payments did not qualify for STP processing, many of them do not require the higher-level, more intense, verification system (which utilizes additional computer and human resources). Therefore, it would be desirable to create a pre-verification layer of the processing system. It would be desirable for the pre-verification layer to focus on providing limited computer and human resources to mediocre payments which do not qualify for STP, but do not require the higher-level verification system. It may be desirable because the pre-verification system may conserve both human and computer resources by limiting the allocation of those resources to payments which do not require them.

SUMMARY OF THE INVENTION

A system which may categorize incoming payments is provided. The categorization may be performed by optical character recognition software. The categorization may enable proper allocation of time and human resources to each individual payment. The categorization may reduce wasted time and resources by allotting each payment the amount of resources necessary to determine the information stored thereon.

The categorization may include a three-tiered system. The three-tiered system may include a straight-through processing ("STP") subsystem, a pre-verification subsystem and a verification subsystem. The STP subsystem may process the proper subset of payments. The pre-verification subsystem may process the mediocre subset of payments. The verification subsystem may process the illegible subset of payments.

An apparatus for optical character recognition is provided. The apparatus may include a receiver. The receiver may be located at a mailbox location. The receiver may be located at a post office box location. The receiver may be located at any other suitable location.

The receiver may receive a plurality of payments. Each payment may include a paper check. The paper check may include MICR ink. The MICR ink may identify a routing number and an account number associated with the paper check. The MICR ink may also identify other information associated with the paper check.

The paper check may also include information that the remitter of paper check entered. The entered information may include a legal amount of the check, a courtesy amount of the check, a memo, a signature, a beneficiary name, and/or any other suitable information.

The paper check may also include standard printed information. The printed information may include a name, address and phone number associated with the remitter. The printed information may include a name of a financial institution associated with the paper check. The printed information may include a check number associated with the check.

Each payment may also include a remit stub. A remit stub may be a portion of a bill, which includes customer identifying information. The remit stub may be transmitted by an entity to a customer. The customer may transmit the remit stub together with a check, and thereby enable the entity to easily identify the payment.

The remit stub may include MICR ink. The MICR ink may include a customer identification number. The MICR ink may also include an amount due from the customer.

In some embodiments, the MICR ink on the remit stub may include a significant number. The significant number may be extracted via a scanner. Embedded in the significant number may be a dollar amount due. Optical character recognition software may utilize the extracted significant number to obtain the dollar amount due. In some embodiments, the extracted significant number may include an indication of the dollar amount due.

The apparatus may also include a scanner. The scanner may be configured to scan the plurality of payments. The scanning may transform the paper check into a paper check electronic record. The scanning may transform the remit stub into a remit stub electronic record.

The apparatus may also include optical character recognition software. The optical character recognition software may extract a legal check amount from the paper check electronic record. The optical character recognition software may also determine a degree of confidence that the extracted legal check amount is the same amount that the writer of the check intended. The determination may be based at least in part on the clarity of the writer's handwriting. The optical character recognition software may also extract a dollar amount due from the remit stub electronic record.

The apparatus may also include a processor. The processor may determine whether the extracted legal check amount (retrieved from the paper check) is the same as the extracted dollar amount due (retrieved from the remit stub). When the processor determines that that the extracted legal check amount is the same as the extracted dollar amount due and the degree of confidence regarding the verification of the determination is above a first predetermined threshold level of confidence, the payment may be processed in the STP system. The STP system may process payments independent of human intervention.

The degree of confidence may be ranked on a scale of one through one hundred, a scale of one to ten, a scale of one through one thousand or any other suitable scale. The first predetermined threshold level may be a percentage. The percentage may be, for example, sixty percent. On a scale of one through ten, confidence levels of six and above may be considered to fall above the first predetermined threshold level of sixty percent.

When the extracted legal check amount is the same as the extracted dollar amount due and the degree of confidence is below the first predetermined level of confidence and above a second predetermined threshold level of confidence, the payment may be processed in a pre-verification system. The second predetermined threshold level of confidence may be a percentage. The percentage may be, for example, forty percent. On a scale of one through ten, confidence levels of four and above may be considered to fall above the second predetermined threshold level of forty percent.

The pre-verification system may include a pre-verification graphical user interface ("GUI"). The pre-verification GUI may enable an operator to view one or more payments included in the plurality of payments. The pre-verification GUI may include a view of the paper check electronic record. The pre-verification GUI may include a view of the remit stub electronic record. The pre-verification GUI may include the extracted dollar amount. The pre-verification GUI may also include a match button. The pre-verification GUI may also include a does not match button.

When the operator selects the match button, the payment may be processed in the STP system. The additional review by the pre-verification system may cause the confidence level (that the payment is correct) to rise above the first predetermined threshold level of confidence and thereby render the payment eligible for further processing, independent of additional human intervention.

When the operator selects the does not match button, the payment may be directed for further processing in the verification system. The additional review by the pre-verification system, which showed that the payment was not easily decipherable, may cause the confidence level to drop below the second threshold level of confidence and thereby render the payment eligible for processing in the verification system.

In some embodiments, the pre-verification GUI may include a do not know button. When the operator selects the do not know button, the payment may be directed to, and processed in the verification system.

In some embodiments, upon selection of the match button, the does not match button, or the do not know button by the operator, the pre-verification GUI may present a second payment to the operator.

When the extracted legal check amount is the same as the extracted dollar amount due and the degree of confidence is below the second predetermined threshold level of confidence, the payment may be processed in a verification system. In certain embodiments, the verification system may include a verification GUI. The verification GUI may be presented to two distinct operators. Each operator may be enabled to view the same payment included in the plurality of payments.

The verification GUI may include a view of the paper check electronic record. The verification GUI may include a view of the remit stub electronic record. The verification GUI may include a text entry field. The text entry field may accept user input relating to the legal check amount of the paper check.

The verification system may include a processor. The processor may determine whether the amount entered by the first operator into the text entry field is the same as the amount entered by the second operator into the text entry field. When the amounts are the same, the payment may be processed further, independent of additional human intervention. When the amount entered by the first operator and the amount entered by the second operator are not the same, the payment may be transmitted, using a transmitter, for resolve processing. Resolve processing may include review and processing of the payment by resolve personnel. Resolve processing is not independent of human intervention.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 4 shows an illustrative GUI in accordance with the principles of the invention; and FIG. 5 shows an illustrative GUI in accordance with the principles of the invention.

DETAILED DESCRIPTION OF THE DISCLOSURE

Figure 1:
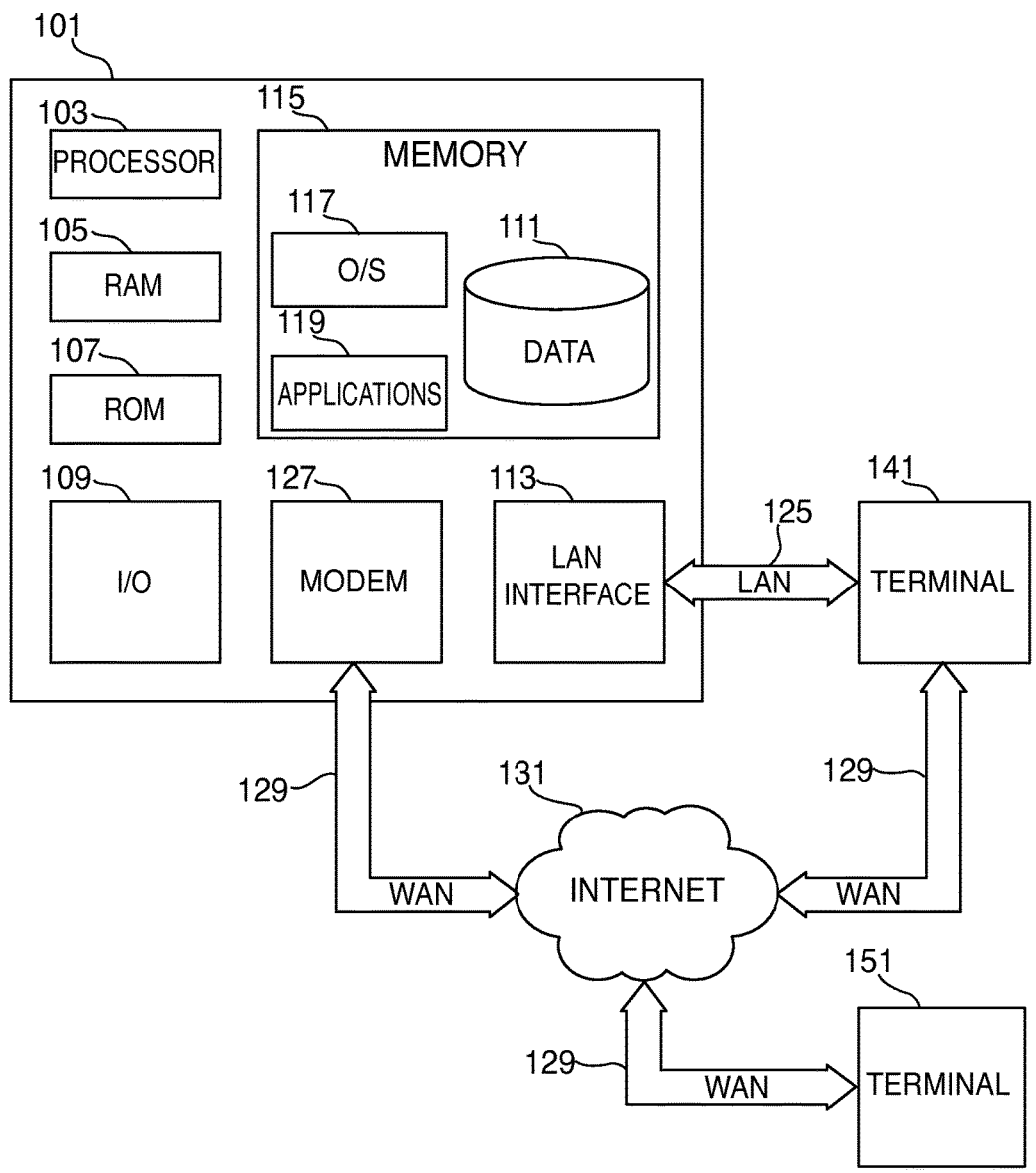
FIG. 1 shows an illustrative apparatus in accordance with principles of the invention.

A method for optical character recognition is provided. The method may include receiving a plurality of payments. Each payment may include a paper check and a remit stub. The method may include scanning the plurality of payments. The scanning may transform each paper check into a paper check electronic record. The scanning may also transform each remit stub into a remit stub electronic record.

The method may also include extracting a legal check amount from the paper check electronic record. The extracting may be performed using optical character recognition software.

The method may also include determining a degree of confidence that the extracted legal check amount is the same amount that the writer of the paper check intended. The determining may be based at least in part on the clarity of the writer's handwriting. The determining may be performed using optical character recognition software.

The method may also include extracting a dollar amount due from the remit stub electronic record. The extracting may be executed by optical character recognition software. The method may also include determining whether the extracted legal check amount is the same as the extracted dollar amount due.

The method may include processing the payment in an STP system when the extracted legal check amount is the same as the extracted dollar amount due and the degree of confidence is above the first predetermined threshold level of confidence. The STP system may process the payment independent of user intervention.

The method may include processing the payment in a pre-verification system when the extracted dollar amount due and the degree of confidence is below the first predetermined threshold level of confidence and above a second predetermined threshold level of confidence.

The pre-verification system may include viewing one payment, from the plurality of payments, on a pre-verification GUI by an operator. The viewing may include viewing the paper check electronic record. The viewing may include viewing the remit stub electronic record. The viewing may include viewing the extracted dollar amount due. The viewing may include viewing a match button. The viewing may include viewing a does not match button.

The method may include processing the one viewable payment independent of additional human intervention upon selection of the match button by the operator. The method may also include processing the one viewable payment in the verification system upon selection of the does not match button by the operator.

The method may include presenting the verification GUI to two distinct operators. Each operator may be enabled to view the same payment included in the plurality of payments.

The method may include viewing the paper check electronic record on the verification GUI. The method may include viewing the remit stub electronic record on the verification GUI. The method may include viewing a text entry field which accepts user input on the verification GUI. The user input may be related to the legal check amount of the paper check. The method may include entering a legal check amount into the text entry field by a first operator of the two distinct operators. The method may include entering a legal check amount into the text entry field by a second operator of the two distinct operators.

The method may include determining whether the amount of the first operator's entered legal check amount and the amount of the second operator's legal check amount are the same. The method may include processing the one viewable payment independent of further human interaction when the legal check amounts are the same. The method may include transmitting the payment for resolve processing when the amounts are not the same. The transmitting may be performed by a transmitter.

It should be appreciated that the three-tiered system may enable the underlying computer system to operate more efficiently. The proper payments may require less machine resources. Therefore, the three-tiered system may allocate fewer resources for each proper payment in the STP system. The mediocre payments may require more machine resources than the STP-qualifying payments, but less machine resources than the verification-qualifying payments. Therefore, the pre-verification system may allocate slightly more resources, i.e., one operator with one computer and one GUI, to the mediocre payments. The lesser-quality payments may require more resources, i.e., two operators and two computers and two GUIs. Therefore, the lesser-quality payments may be processed in the verification system.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 is an illustrative block diagram of mobile device system 100 based on a computer 101. The computer 101 may have a processor 103 for controlling the operation of the mobile device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other mobile device systems via a LAN interface 113.

System 100 may operate in a networked environment supporting connections to one or more remote computers, such as terminals 141 and 151. Terminals 141 and 151 may be personal computers or servers that include many or all of the elements described above relative to mobile device system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be mobile devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other mobile devices. These mobile devices may be identical to mobile device system 100 or different. The differences may be related to hardware components and/or software components.

Figure 2:
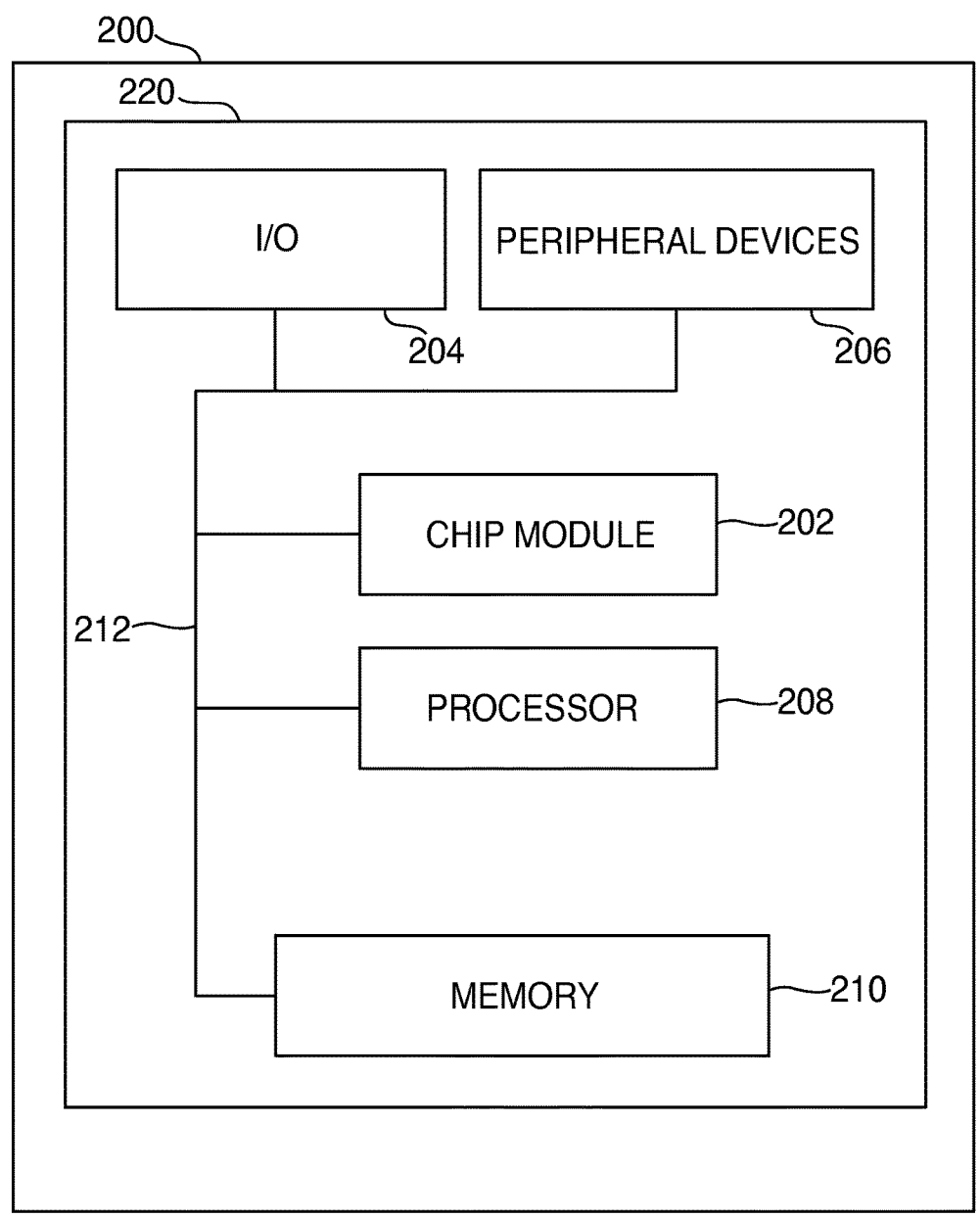
FIG. 2 shows an illustrative apparatus in accordance with principles of the invention.

FIG. 2 shows illustrative apparatus 200. Apparatus 200 may be a computing machine. Apparatus 200 may include one or more features of the apparatus shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data; and machine-readable memory 210.

Machine-readable memory 210 may be configured to store in machine-readable data structures: account numbers, remit stub information, check information and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
FIG. 3 shows an illustrative GUI in accordance with the principles of the invention.

FIG. 3 shows an illustrative pre-verification GUI. A customer may have mailed a payment to an entity. The payment may have included a remit stub and a check. The optical character recognition software may have determined that the dollar amount of both the remit stub and the check was $3,000.00. A degree of confidence may be obtained by the optical character recognition software. The degree of confidence may be based on whether the determined dollar amount was the amount that the writer of the check intended. The degree of confidence may have been below a first predetermined threshold level of confidence and above a second predetermined threshold level of confidence. Therefore, the payment may have been transferred to the pre-verification system.

The pre-verification GUI may include a view of the remit stub shown at 302. The pre-verification GUI may include a view of the check shown at 304. The pre-verification GUI may also include a selectable match button 308 and a selectable does not match button 310. The pre-verification GUI may be viewed by an operator. Upon selection of the match button by the operator, the system may transfer the payment for further processing in the STP system, as described above. Upon selection of the does not match button by the operator, the system may transfer, or alternatively route, the payment for further processing by the verification system, as described above.

FIG. 4 shows an illustrative pre-verification GUI. An operator may be presented with remit stub electronic record 402, paper check electronic record 404, dollar amount 406, match button 408 and does not match button 410.

The optical character recognition software may have determined that the dollar amount of both the paper check and the remit stub is $2,000.00. The correct amount may have been $3,000.00. An operator viewing the pre-verification GUI shown on FIG. 4 may select does not match button 410, because the dollar amount, shown at 406, may not be the same as the dollar amount shown on remit stub 402 and check 404. The payment shown in FIG. 4 may be transmitted for verification processing, as described above.

FIG. 5 shows illustrative pre-verification GUI. FIG. 5 is substantially similar to FIG. 4. FIG. 5 has an additional button. The additional button may be do not know button 512. An operator who cannot decipher the check amount or the remit stub amount may select the do not know button. Such a selection may cause the payment to be transferred for further processing in the verification system, as described above.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network.

In a distributed computing environment, program modules may be located in both local and remote computer storage media including memory storage devices. In a distributed computing environment, devices that perform the same or similar function may be viewed as being part of a "module" even if the devices are separate (whether local or remote) from each other.

Thus, methods and apparatus for an optical character pre-verification system are provided. Persons skilled in the art will appreciate that the present invention can be practiced by other than the described embodiments, which are presented for purposes of illustration rather than of limitation, and that the present invention is limited only by the claims that follow.

What is claimed is:

1. An apparatus for optical character recognition, the apparatus comprising:
   a receiver configured to receive:
      a plurality of payments, each payment included in the plurality consists of:
         a paper check; and
         a remit stub;
   a scanner configured to scan the plurality of payments, thereby transforming:
      the paper check into an electronic record of the paper check; and
      the remit stub into an electronic record of the remit stub;
   optical character recognition software which:
      extracts a legal check amount from the electronic record of the paper check;
      determines a degree of confidence that the extracted legal check amount is the same amount that a writer of the check intended, the determination being based at least in part on the clarity of the writer's handwriting;

extracts a dollar amount due from the electronic record of the remit stub;

a processor configured to determine whether the extracted legal check amount is the same as the extracted dollar amount due;

when the extracted legal check amount is the same as the extracted dollar amount due and the degree of confidence is above a first predetermined threshold level of confidence, the payment is processed in a straight through processing ("STP") system, independent of human intervention;

when the extracted legal check amount is the same as the extracted dollar amount due and the degree of confidence is below the first predetermined threshold level of confidence and above a second predetermined threshold level of confidence, the payment is processed in a pre-verification system, the pre-verification system comprising a pre-verification graphical user interface, the pre-verification graphical user interface enabling an operator to view one payment included in the plurality of payments, the pre-verification graphical user interface comprising:
 a view of the electronic record of the paper check;
 a view of the electronic record of the remit stub;
 the extracted dollar amount;
 a selectable match button; and
 a selectable does not match button;
the pre-verification system further comprising:
 when the operator selects the match button, the payment is processed independent of further human intervention; and
 when the operator selects the does not match button, the payment is processed in the verification system;
when the extracted legal check amount is the same as the extracted dollar amount due and the degree of confidence is below the second predetermined level of confidence, the payment is processed in a verification system, said verification system comprising a verification graphical user interface, the verification graphical user interface being presented to two distinct operators, each operator being enabled to view the same payment included in the plurality of payments, the verification graphical user interface comprising:
 a view of the electronic record of the paper check;
 a view of the electronic record of the remit stub;
 a text entry field which accepts user input relating to the legal check amount of the paper check;
the verification system further comprising:
 the processor configured to determine whether the amount of the first operator's entered legal check amount and the second operator's legal check amount are the same;
 when the amounts are the same, processing the payment independent of further human intervention;
 when the amounts are not the same, transmitting, using a transmitter, the payment for resolve processing.

2. The apparatus of claim 1, wherein:
the remit stub further comprises a significant number printed in MICR ink;
the significant number is extracted via the scanner;
embedded in the significant number is the dollar amount due; and
the optical character recognition software utilizes the extracted significant number to extract the dollar amount due.

3. The apparatus of claim 1, wherein the pre-verification graphical user interface further comprises a selectable do not know button, and when the operator selects the do not know button, the payment is processed in the verification system.

4. The apparatus of claim 3, wherein upon selection of the match button, the pre-verification graphical user interface presents a second payment to the operator.

5. The apparatus of claim 3, wherein upon selection of the does not match button, the pre-verification graphical user interface presents a second payment to the operator.

6. The apparatus of claim 3, wherein upon selection of the do not know button, the pre-verification graphical user interface presents a second payment to the operator.

7. An apparatus for optical character recognition, the apparatus comprising:
a receiver configured to receive:
 a plurality of payments, each payment included in the plurality comprising:
  a paper check; and
  a remit stub;
a scanner configured to scan the plurality of payments, thereby transforming:
 the paper check into an electronic record of the paper check;
 the remit stub into an electronic record of the remit stub;
optical character recognition software which:
 extracts a legal check amount from the electronic record of the paper check;
 determines a degree of confidence that the extracted legal check amount is the same amount that a writer of the check intended, the determination being based at least in part on the clarity of the writer's handwriting;
 extracts a dollar amount due from the electronic record of the remit stub;
a processor configured to determine whether the extracted legal check amount is the same as the extracted dollar amount due;
when the extracted legal check amount is the same as the extracted dollar amount due and the degree of confidence is above a first predetermined threshold level of confidence, the payment is processed in a straight through processing ("STP") system, independent of human intervention;
when the extracted legal check amount is the same as the extracted dollar amount due and the degree of confidence is below the first predetermined threshold level of confidence and above a second predetermined threshold level of confidence, the payment is processed in a pre-verification system, the pre-verification system comprising a pre-verification graphical user interface, the pre-verification graphical user interface enabling an operator to view one payment included in the plurality of payments, the pre-verification graphical user interface comprising:
 a view of the electronic record of the paper check;
 a view of the electronic record of the remit stub;
 the extracted dollar amount;
 a selectable match button;
 a selectable does not match button;

the pre-verification system further comprising:
    when the operator selects the match button, the payment is processed without further human intervention; and
    when the operator selects the does not match button, the payment is processed in the verification system;
when the extracted legal check amount is the same as the extracted dollar amount due and the degree of confidence is below the second predetermined level of confidence, the payment is processed in a verification system, said verification system comprising a verification graphical user interface, the verification graphical user interface being presented to two distinct operators, each operator being enabled to view the same payment included in the plurality of payments, the verification graphical user interface comprising:
    a view of the electronic record of the paper check;
    a view of the electronic record of the remit stub;
    a text entry field which accepts user input relating to the legal check amount of the paper check;
the verification further comprising:
    the processor configured to determine whether the legal check amount entered into the text entry field by first operator and the legal check amount entered into the text field by the second operator are the same;
    when the amounts are determined to be the same, processing the payment without further human intervention;
    when the amounts are not the same, transmitting, using a transmitter, the payment for resolve processing.

8. The apparatus of claim 7, wherein:
the remit stub further comprises a significant number printed in MICR ink;
the significant number is extracted via the scanner;
embedded in the significant number is the dollar amount due; and
    the optical character recognition software utilizes the extracted significant number to extract the dollar amount due.

9. The apparatus of claim 8, wherein the pre-verification graphical user interface further comprises a selectable do not know button, and when the operator selects the do not know button, the payment is processed in the verification system.

10. The apparatus of claim 9, wherein upon selection of the match button by the operator, the pre-verification graphical user interface presents a second payment to the operator.

11. The apparatus of claim 9, wherein upon selection of the does not match button by the operator, the pre-verification graphical user interface presents a second payment to the operator.

12. The apparatus of claim 3, wherein upon selection of the do not know button, the pre-verification graphical user interface presents a second payment to the operator.

13. One or more non-transitory computer readable media having code stored thereon which, when executed by a processor on a computer system, performs a method for optical character recognition, the method comprising:
    receiving a plurality of payments, wherein each payment consists of a paper check and a remit stub;
    scanning the plurality of payments, thereby transforming:
        each paper check into a paper check electronic record; and
        each remit stub into a remit stub electronic record;
    extracting, using optical character recognition software, a legal check amount from the paper check electronic record;
    determining, using optical character recognition software, a degree of confidence that the extracted legal check amount is the same amount that a writer of the paper check intended, the determining being based at least in part on the clarity of the writer's handwriting;
    extracting, using optical character recognition software, a dollar amount due from the remit stub electronic record;
    determining whether the extracted legal check amount is the same as the extracted dollar amount due;
    when the extracted legal check amount is the same as the extracted dollar amount due and the degree of confidence is above a first predetermined threshold level of confidence, processing the payment in a straight through processing ("STP") system, independent of user intervention;
    when the extracted legal check amount is the same as the extracted dollar amount due and the degree of confidence is below the first predetermined threshold level of confidence and above a second predetermined threshold level of confidence, processing the payment in a pre-verification system, the pre-verification system comprising:
        viewing one payment, from the plurality of payments, on a pre-verification graphical user interface ("GUI") by an operator, the viewing comprising:
            viewing the paper check electronic record;
            viewing the remit stub electronic record;
            viewing the extracted dollar amount;
            viewing a selectable match button; and
            viewing a selectable does not match button;
        processing the one viewable payment without further human intervention upon selection of the match button by the operator;
        processing the one viewable payment in the verification system upon selection of the does not match button, the verification system comprising a verification GUI;
        presenting the verification GUI to two distinct operators, each operator being enables to view the same payment included in the plurality of payments;
        viewing the paper check electronic record on the verification GUI;
        viewing the remit stub electronic record on the verification GUI;
        viewing a text entry field which accepts user input relating to the legal check amount of the paper check;
        entering a legal check amount into the text entry field by a first operator of the two distinct operators;
        entering a legal check amount into the text entry field by a second operator of the two distinct operators;
        determining whether the amount of the first operator's entered legal check amount and the amount of the second operator's legal check amount are the same;
        processing the one viewable payment without further human intervention when the legal check amounts are the same;
        transmitting, using a transmitter, the payment for resolve processing, when the amounts are not the same.

14. The method of claim 13, further comprising:
extracting, via the scanner, a significant number, printed in MICR ink, from the remit stub; and
extracting, using the optical character recognition software, an embedded dollar amount due from the significant number.

15. The method of claim 13, further comprising:
viewing a do not know button on the pre-verification GUI; and
processing the payment in the verification system upon selection of the do not know button by the operator.

16. The method of claim 15, further comprising presenting a second payment to the operator on the pre-verification GUI upon selection of the match button by the operator.

17. The method of claim 15, further comprising presenting a second payment to the operator on the pre-verification GUI upon selection of the do not match button by the operator.

18. The method of claim 15, further comprising presenting a second payment to the operator on the pre-verification GUI upon selection of the do not know button by the operator.

* * * * *